United States Patent [19]

Harrington

[11] Patent Number: 5,353,390
[45] Date of Patent: Oct. 4, 1994

[54] CONSTRUCTION OF ELEMENTS FOR THREE-DIMENSIONAL OBJECTS

[75] Inventor: Steven J. Harrington, Holley, N.Y.

[73] Assignee: Xerox Corporation, Stamford, Conn.

[21] Appl. No.: 795,607

[22] Filed: Nov. 21, 1991

[51] Int. Cl.⁵ .............................................. G06F 15/72
[52] U.S. Cl. .................... 395/120; 395/123; 395/127
[58] Field of Search ............... 395/120, 119, 123, 127, 395/133; 364/512; 434/79, 211, 365

[56] References Cited

U.S. PATENT DOCUMENTS

| | | | |
|---|---|---|---|
| 4,551,810 | 11/1985 | Levine | 364/512 X |
| 4,554,635 | 11/1985 | Levine | 364/512 X |
| 4,736,306 | 4/1988 | Christensen et al. | 395/120 |
| 4,847,778 | 7/1989 | Daley | 364/512 X |
| 4,912,644 | 3/1990 | Aoyama et al. | 395/119 X |
| 5,038,291 | 8/1991 | Wang et al. | 395/120 X |
| 5,058,042 | 10/1991 | Hanna et al. | 395/127 |
| 5,107,444 | 4/1992 | Wu | 395/119 |
| 5,278,983 | 1/1994 | Kawabe et al. | 395/120 |

*Primary Examiner*—Raymond J. Bayerl
*Attorney, Agent, or Firm*—Oliff & Berridge

[57] ABSTRACT

Elements of a three-dimensional object having a plurality of flat polygonal surfaces are constructed by providing a visual model of the object and constructing a graph from the visual model. The graph illustrates a plurality of nodes connected by lines. Each node represents one of the polygonal surfaces, and each line connecting the nodes corresponds to an edge of the visual model located between corresponding polygonal surfaces. One of the nodes is selected as a starting node, and the graph is traversed beginning at the starting node. The traversal continues by successively traveling from previously selected nodes to previously unselected nodes along the lines without selecting any node more than once. The elements are constructed by drawing a corresponding polygon for each node as the nodes are selected.

20 Claims, 6 Drawing Sheets

CONSTRUCTION OF ELEMENTS FOR THREE-DIMENSIONAL OBJECTS

BACKGROUND OF THE INVENTION

1. Field of the Invention

The present invention relates to the construction of elements for three-dimensional objects and, more particularly, to the construction of elements for three-dimensional objects having a plurality of flat polygonal surfaces.

2. Description of the Related Art

Computer-aided design and computer graphics often model three-dimensional objects. Techniques have been developed to display these objects on two-dimensional media such as paper, CRT display screens, etc. Such display media adequately represent a single view of the object projected onto the media. When added realism and information are desirable, a series of such views can be produced, for example, by rotations or fly-bys. The production of such a series of views is, however, limited to devices which support animation.

Three-dimensional views rather than single projections can be produced using, for example, holograms or shuttered glasses. These media are not, however, always available. Further, the designer may still require construction of an actual three-dimensional model of the object for better understanding or to better describe the object to others.

U.S. Pat. No. 4,847,778 to Daley discloses a computerized apparatus for designing sheet metal fittings. The system includes a computer, a computer-controlled X-Y plotter and software programs. Designs for fittings are made sequentially in real-time. Sheet metal is marked with the X-Y plotter to provide two-dimensional patterns for sheet metal pieces. After the patterns are cut out of the sheet metal, the resultant two-dimensional sheet metal pieces are manipulated and assembled into three-dimensional sheet metal fittings.

U.S. Pat. No. 4,551,810 to Levine discloses a method and apparatus for partially automatically designing a conduit network and automatically producing patterns for cutting out sides of conduit sections from laminar material. Pattern-type and dimensional data are fed directly from a memory of a CAD system to a CAM pattern generating and fabricating system. The patterns for the closed sides of the conduit network are developed from mathematical relationships specifying the geometry of the basic pattern types.

U.S. Pat. No. 4,554,635 to Levine discloses a method and apparatus for creating, laying out and cutting patterns on laminar sheet material, thereby permitting fully automated creation of patterns required to subsequently construct three-dimensional products. Information representative of geometric configurations of a group of basic pattern types, including mathematical relationships, is stored in digital form in an electronic memory. From the basic pattern types, substantially all variations of a three-dimensional product can be developed. An operator specifies the type of product required and inputs the basic dimensions of the product. Patterns for closed sides of the product are developed from the mathematical relationships specifying the geometry of the basic pattern types in response to the input basic dimensions.

The above-discussed references provide two-dimensional pattern shapes which can be cut-out, manipulated and assembled. The references do not disclose construction of a physical model of a computer-generated object, the model providing elements constructed directly from printed shapes. They do not disclose construction for arbitrary polyhedral shapes.

OBJECTS AND SUMMARY OF THE INVENTION

An object of the present invention is to provide construction elements for a three-dimensional object which, when cut-out, folded and pasted together form a physical model of the object.

Another object of the present invention is to provide construction elements for a three-dimensional object which can be constructed directly from printed shapes.

Another object of the present invention is to provide construction elements for a three-dimensional object which can be used as a pattern for forming the object.

A further object of the present invention is to provide construction elements for a polygonal three-dimensional object.

A further object of the invention is to provide construction elements for arbitrary three-dimensional shapes having polygonal surfaces.

To achieve the foregoing and other objects and to overcome the shortcomings discussed above, a method of outputting construction elements for a three-dimensional object is described. Elements of the three-dimensional object having a plurality of flat polygonal surfaces are constructed by providing a visual model, e.g., a computer model, of the object and constructing a graph from the model. The graph comprises a plurality of nodes connected by lines. Each node represents one of the polygonal surfaces, and each line connecting the nodes corresponds to an edge of the visual model located between corresponding polygonal surfaces. One of the nodes is selected as a starting node, and the graph is traversed beginning at the starting node. The traversal comprises successively traveling from one node to another along the lines without visiting any node more than once. The elements are constructed by drawing a corresponding polygon for each node as the nodes are visited.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
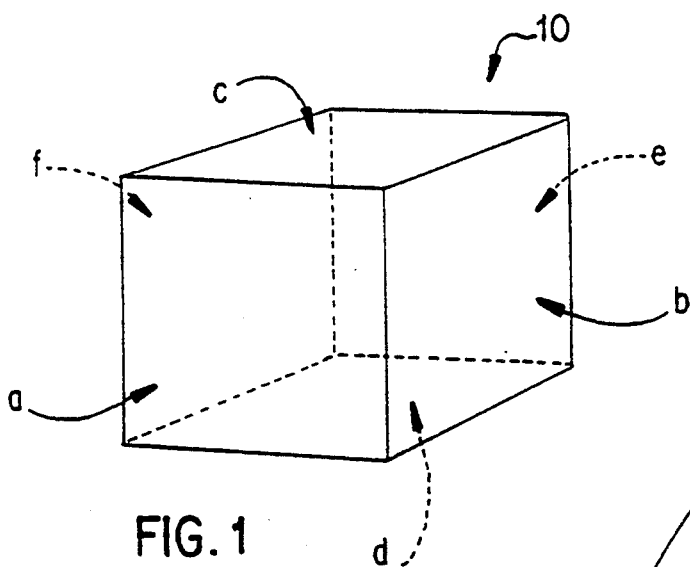
FIG. 1 illustrates a two-dimensional view of a three-dimensional object.

Referring now to the drawings, and particularly to FIG. 1 thereof, a two-dimensional view of a three-dimensional object 10 is described. In accordance with the present invention, construction elements for object 10 are required which, when cut-out, folded and/or pasted together, will form a physical three-dimensional model of object 10.

Object 10 comprises a plurality of polygonal surfaces attached to one another by edges. The well known techniques of computer graphics and solid modeling may be used for construction of a computer model of an object wherein the polygonal surface specifications and the connection relations between polygons are readily available. In accordance with the present invention, each polygonal surface a–f is represented by a node provided with the same designation as its corresponding polygonal surface. Computer techniques for representing a graph of nodes and for traversing the graph in the manner described in this invention are also well known.

Figure 2:
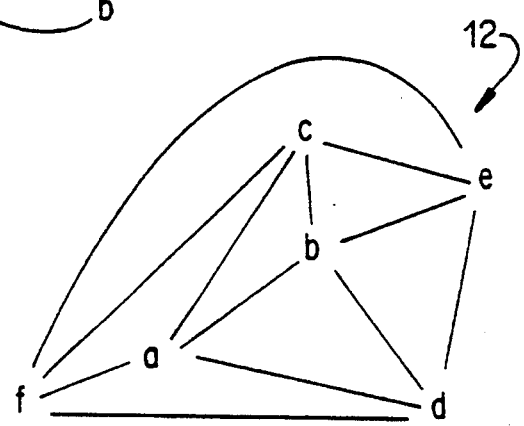
FIG. 2 illustrates a graph of the FIG. 1 object in accordance with the present invention.

As illustrated in FIG. 2, a graph 12 is constructed from object 10, graph 12 comprising a plurality of nodes a–f connected by lines. Each node corresponds to a polygonal surface of object 10. Each line corresponds to an edge between polygonal surfaces, the line between two nodes representing an edge of object 10 between the two polygonal surfaces represented by the corresponding nodes. Because model 10 comprises six polygonal surfaces and twelve edges, graph 12 should include six nodes and twelve lines connecting the nodes.

Figure 3A:
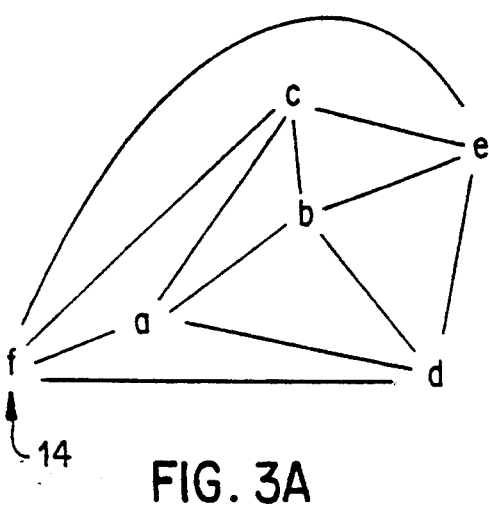
FIG. 3A illustrates the selection of the starting node for the FIG. 2 graph in accordance with the present invention.

Once graph 12 is constructed, a starting node 14 is selected as illustrated in FIG. 3A. For exemplary purposes, node f is selected as starting node 14.

Figure 3B:
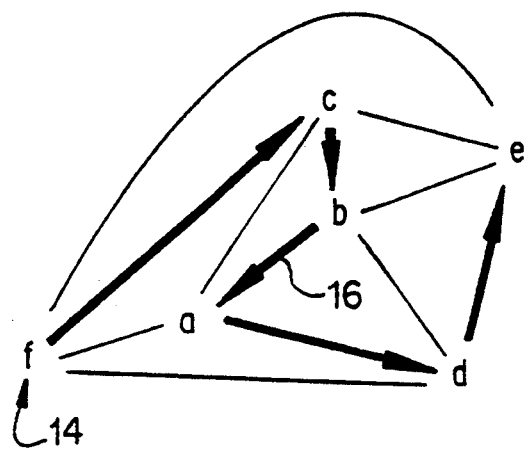
FIG. 3B illustrates traversal of the FIG. 2 graph.

As illustrated in FIG. 3B, graph 12 is then traversed beginning at starting node 14. Graph 12 is traversed in accordance with traversal path 16 by successively traveling from one node to another along the lines without visiting any node more than once. FIG. 3B illustrates traversal path f→c→b→a→d→e.

Figure 4A:
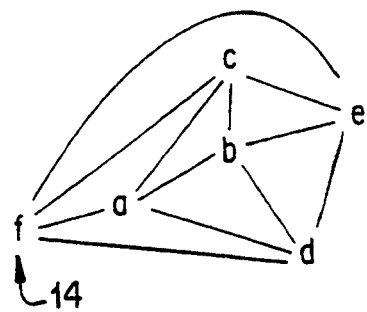
FIGS. 4A-4H illustrate the drawing of polygons in accordance with graph traversal to output construction elements for the FIG. 1 object.
Figure 4B:
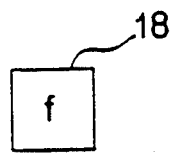
Figure 4C:
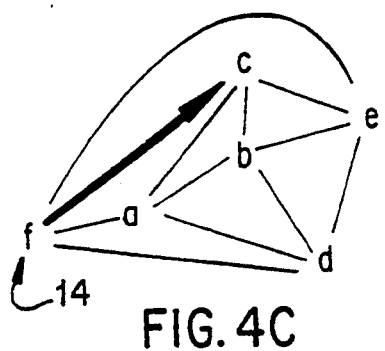
Figure 4D:
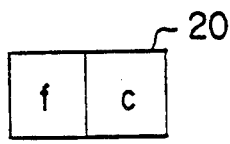

Once traversal path 16 is defined, as illustrated in FIGS. 4A through 4H, the drawing of polygons represented by the nodes is performed. Beginning with starting node 14, polygon 18 is drawn which corresponds to the polygon represented by node f. FIGS. 4C and 4D illustrate the drawing of polygon 20 which corresponds to the next node c encountered in the traversal path 16. Polygon 20 is drawn adjacent to polygon 18 in accordance with the orientation of the edge between polygons as determined from object 10.

Figure 4E:
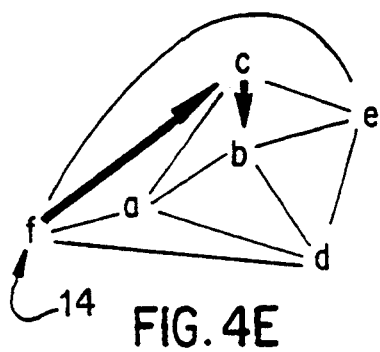
Figure 4F:
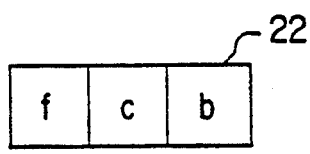

As a result of traversal of graph 16 from node c to node b, as illustrated in FIGS. 4E and 4F, corresponding polygon 22 is added to polygons 18 and 20. Polygon 22 corresponding to the polygon surface represented by node b is drawn adjacent to polygon 20 such that the boundary between polygons corresponds to the graph edge between the polygon surfaces represented by nodes c and b.

Figure 4G:
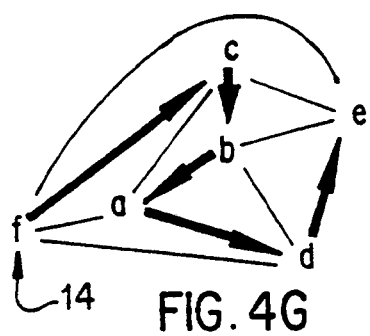
Figure 4H:
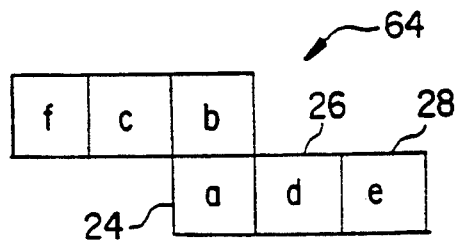

As traversal of graph 16 progresses from node b to a as illustrated in FIGS. 4G and 4H, the polygon 24 represented by node a is added to polygons 18, 20 and 22. In accordance with the orientation of the edge between the polygons represented by nodes b and a, polygon 24 is drawn beneath polygon 22 as illustrated in FIG. 4H.

In a similar manner, as graph 16 is followed from node a to node d and from node d to node e, polygons 26 and 28 represented by nodes d and e, respectively, are added to polygons 18, 20, 22 and 24. Based on the orientation of the edges between the polygon surfaces represented by nodes a, d, and e, the polygons are drawn next to one another as illustrated in FIG. 4H.

In this manner, a model object 10 can be constructed which, when cut-out and folded, forms a three-dimensional box as represented by object 10.

Figure 4I:
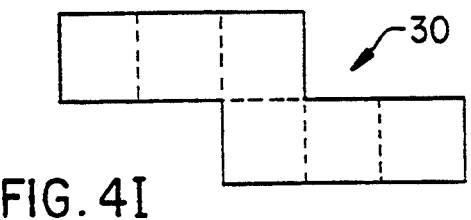
FIG. 4I illustrates a printer shape which can be output for the FIG. 1 object in accordance with the present invention.

Once all of the nodes have been visited, it is possible to determine the layout of the polygons before any polygons are actually printed. If the layout is determined in advance, it is possible to print the polygons, as illustrated in FIG. 4I, such that boundaries between the polygons corresponding to edges followed in the traversal, i.e., fold lines, are printed in a different style, e.g., dashed lines, from the style in which the remaining boundaries, i.e., cut lines, are printed. FIG. 4I illustrates the cut lines printed as solid lines.

Figure 4J:
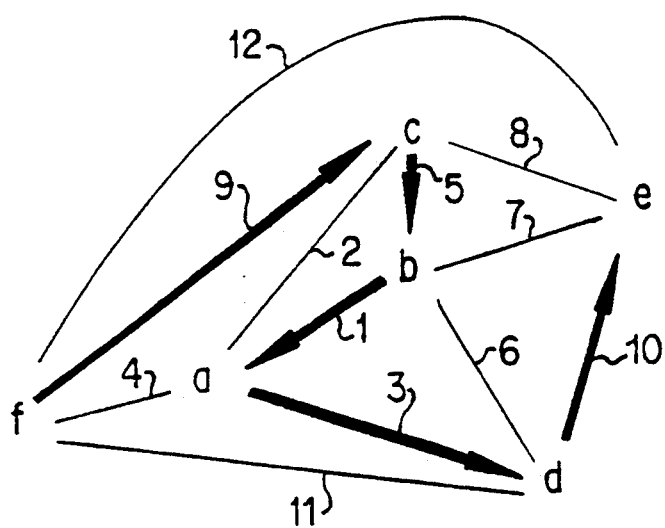
FIGS. 4J and 4K illustrate the labeling of printed lines corresponding to polygon boundaries.
Figure 4K:
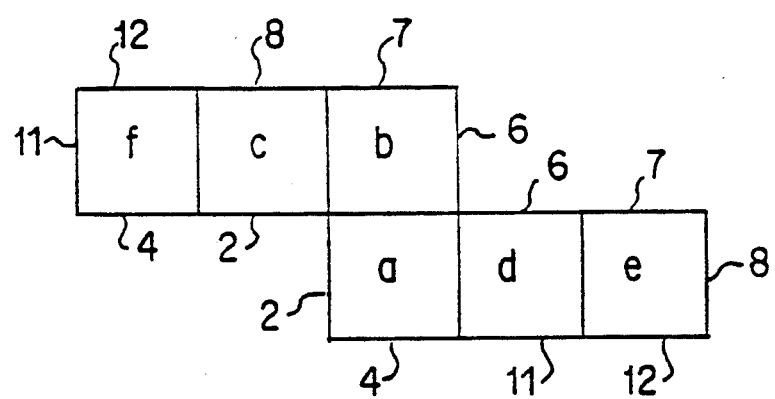

As illustrated in FIG. 4J, the printed lines for the polygon boundaries may be numbered or labeled to indicate how the object should be joined together. The labels correspond to the polygon edges in the visual model and also to the lines connecting the nodes of the graph. As illustrated in FIG. 4K, only those labels corresponding to lines not followed when traversing the graph (cut edges) need be actually printed.

Figure 5:
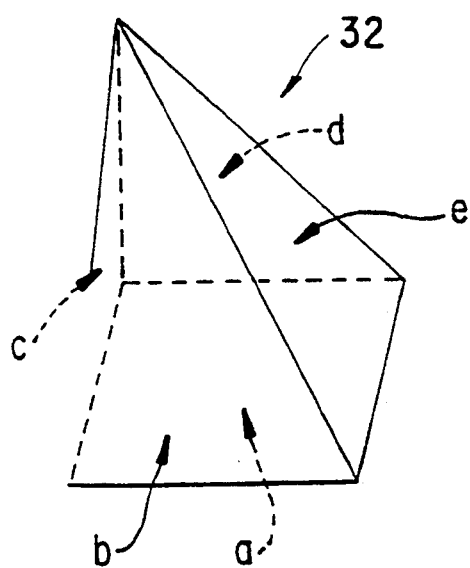
FIG. 5 illustrates a two-dimensional view of another three-dimensional object.

FIG. 5 illustrates a two-dimensional view of another three-dimensional object 32. Object 32 comprises five polygon surfaces connected to one another by eight edges.

Figure 6:
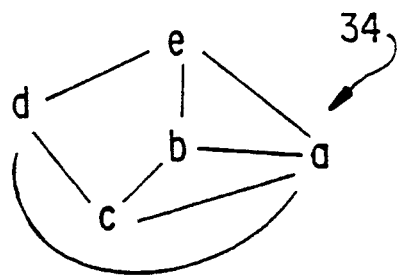
FIG. 6 illustrates a graph of the FIG. 5 object in accordance with the present invention.
Figure 7A:
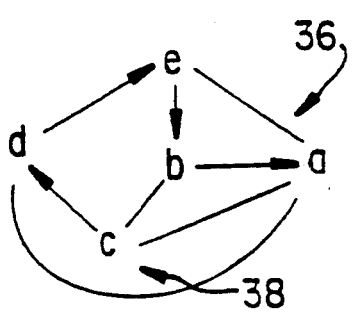
FIGS. 7A and 7B illustrate the drawing of polygons in accordance with traversal of the FIG. 6 graph.
Figures 7B, 7C:
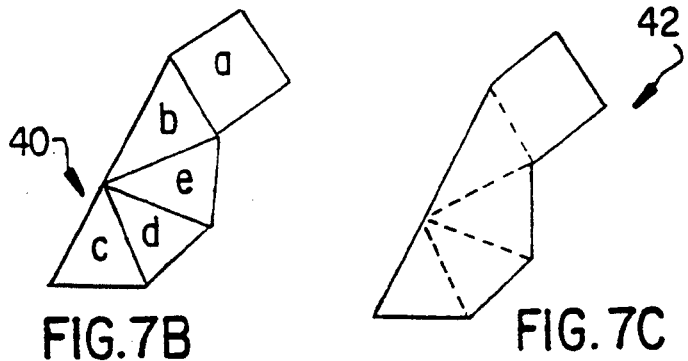
FIG. 7C illustrates a printer shape which can be output in accordance with the FIG. 7A graph traversal.

To generate the construction elements for object 32, a graph 34 as illustrated in FIG. 6 is constructed. If starting node 38 is selected to be node c and the graph is traversed in the following order: c→d→e→b→a as illustrated by reference numeral 36 in FIG. 7A, image 40 illustrated in FIG. 7B results comprising polygons represented by nodes c, d, e, b and a, respectively. This figure, when cut-out and folded, will provide a three-dimensional object corresponding to object 32. FIG. 7C illustrates the printing of image 42 such that boundaries between polygons corresponding to edges followed in the traversal, i.e., fold lines, are printed as dashed lines while the remaining boundaries, i.e., cut lines, are printed as solid lines.

Figure 8A:
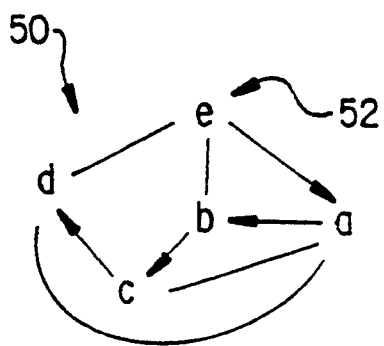
FIGS. 8A and 8B illustrate the construction of polygons in accordance with a different order of graph traversal of the FIG. 6 graph.
Figure 8B:
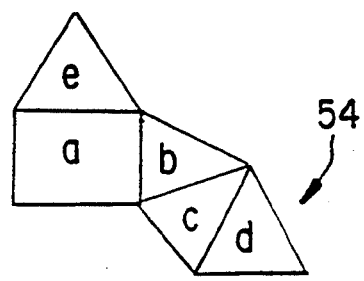

FIG. 8A illustrates an order of traversal 50 of graph 34 if a different starting node 52 is selected to be node e. The exemplary order of traversal 50 illustrated in FIG. 8A is e→a→b→c→d. As polygons corresponding to nodes e, a, b, c and d are drawn, an image 54 results as illustrated in FIG. 8B. When image 54 is cut-out and folded, the three-dimensional object corresponding to object 32 results.

Figure 9A:
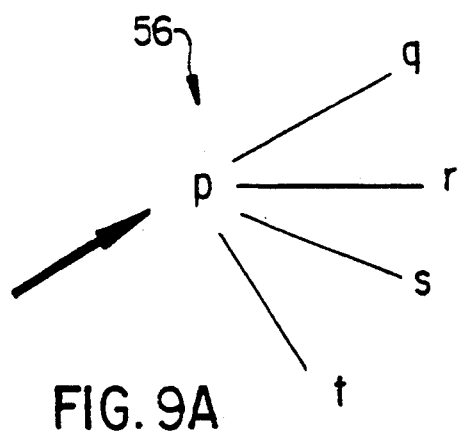
FIGS. 9A–9D illustrate the manner in which node traversal order should be selected.
Figure 9B:
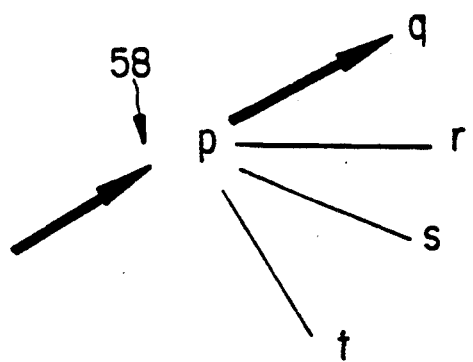
Figure 9C:
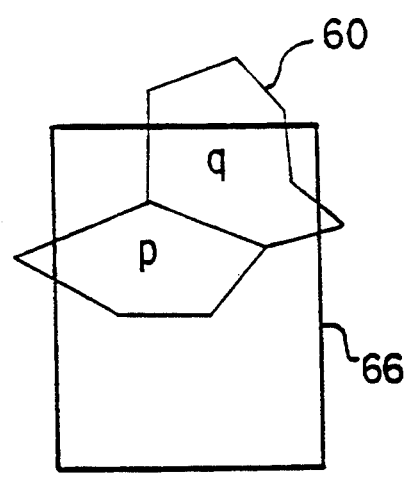

Once a beginning node is selected as illustrated by reference numeral 56 in FIG. 9a, general rules can commonly be used to decide the order of graph traversal. For example, as illustrated by reference numeral 58 in FIG. 9B, if traversal from a node p to a node q results in two polygons being drawn having a relationship to one another such that a resultant shape 60 is obtained which is larger than a page 66 as illustrated in FIG. 9C, node q should not be the next node selected.

Figure 9D:
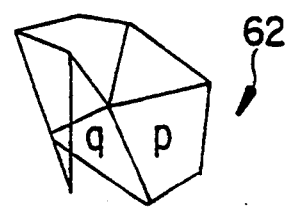

Likewise, if the selection of node q results in the overlap of polygons as illustrated by reference numeral 62 in FIG. 9D, node q should not be the next node selected.

Figure 10A:
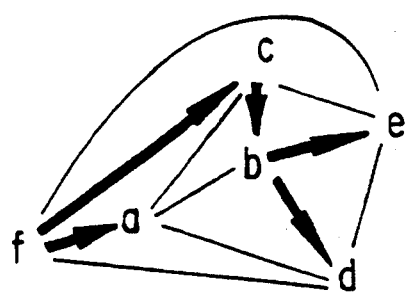
FIGS. 10A and 10B illustrate graph traversal and polygon drawing, respectively, with backtracking of a selection path.
Figure 10B:
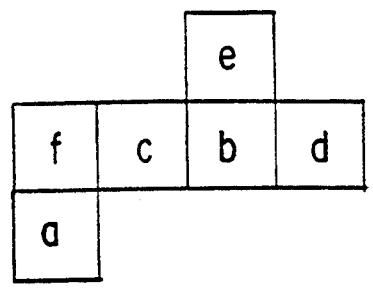

When traversing the graph, the next node selected must be adjacent to some previously selected node, but need not be attached to the immediately preceding selection. Thus, any unselected node (unprocessed node) which is attached to any selected node (previously processed node) is a valid candidate for selection and processing. FIGS. 10A and 10B show a traversal and polygon drawing, respectively, with backtracking of the selection path.

If it is impossible to select a node which: 1) does not cause the polygons to overlap; 2) does not cause the resultant shape to exceed the size of a page; or 3) is reachable from currently selected nodes, the remaining nodes can be processed by removing the selected nodes from the graph, selecting a different starting node, traversing the remaining nodes and drawing the polygons represented by the remaining nodes on an additional piece of paper.

It is desirable to keep the overall resultant drawing compact. Accordingly, a useful heuristic which may be employed in selecting a next node and edge in the traversal is to select a node corresponding to a polygon connected by a longest boundary to any previously drawn polygons. In addition, the starting node can be chosen to be the node corresponding to the polygon having the longest boundaries. In selecting nodes corresponding to polygons having the longest boundaries, the overall resultant drawing will be more compact.

Figure 11:
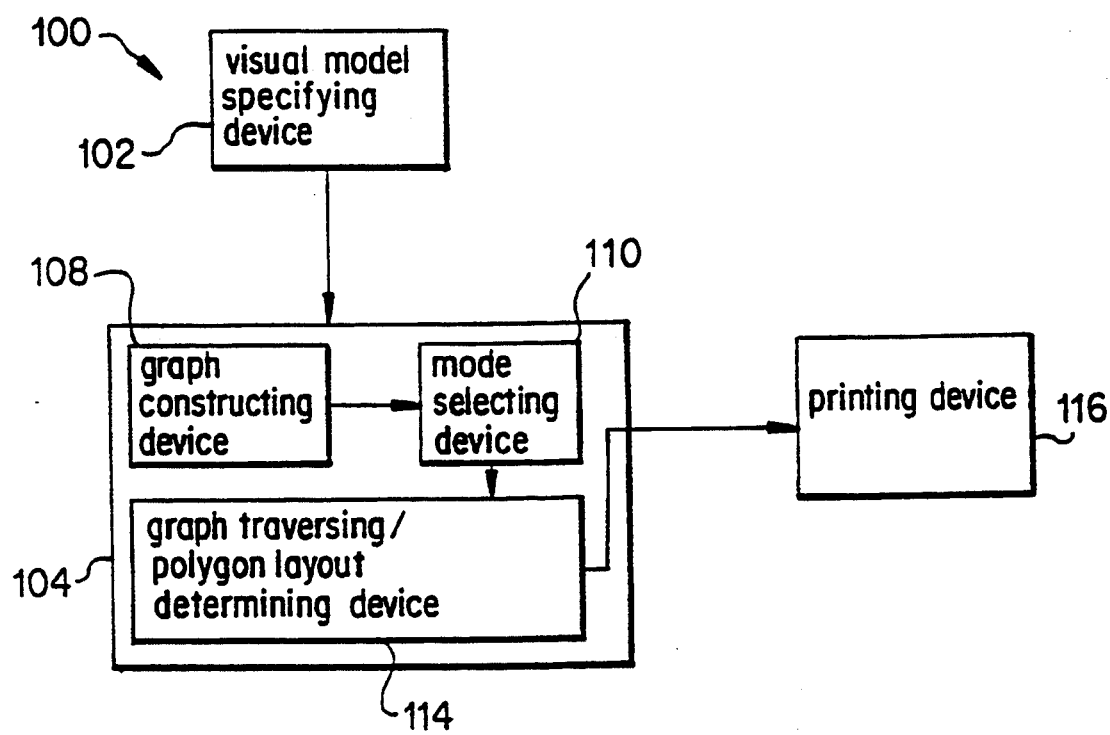
FIG. 11 illustrates a block diagram of an apparatus for element construction in accordance with the present invention.

FIG. 11 illustrates a block diagram of an apparatus 100 which can be used to construct elements in accordance with the present invention. Apparatus 100 comprises a visual model specifying device 102, computer 104 and printing device 116. Visual model specifying device 102, e.g., a CAD system, provides a visual model of the object. Computer 104 includes a graph construction device 108, a node selection device 110, and a graph traversal/polygon layout determination device 114. Printing device 116 draws the polygons on a page as the nodes are visited.

As described above, the present invention enables the generation of construction elements used to create a three-dimensional object. The printout can be used to construct a model directly from paper shapes, or the paper shapes can be used as a pattern for forming the object from a diverse material. While the technique is generally limited to use with objects having flat polygonal surfaces, round surfaces can often be approximated by a plurality of flat polygonal surfaces. Accordingly, this technique can also be used to model three-dimensional objects which can be approximated by a plurality of flat polygonal surfaces.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of constructing elements for a three-dimensional object having a plurality of flat polygonal surfaces, said method comprising:
   providing a visual model of the object;
   constructing a graph from the visual model, said graph comprising a plurality of nodes connected by lines, each node representing one of the polygonal surfaces and each line connecting the nodes corresponding to an edge of the visual model located between corresponding polygonal surfaces;
   selecting one of said nodes and traversing the graph beginning at the selected node, said traversing comprising successively traveling from previously selected nodes to previously unselected nodes along said lines without processing any node more than once; and
   creating elements of the three-dimensional object on a page by drawing a corresponding polygon for each node as the nodes are visited.

2. An apparatus for constructing elements for a three-dimensional object having a plurality of flat polygonal surfaces, said apparatus comprising:
   visual model specifying means for specifying a visual model of the object;
   processing means including:
   constructing means for constructing a graph from the visual model, said graph comprising a plurality of nodes connected by lines, each node representing one of the polygonal surfaces and each line connecting the nodes corresponding to an edge of the visual model located between corresponding polygonal surfaces;
   selecting means for selecting one of said nodes; and
   traversing means for traversing the graph beginning at the node selected by said selecting means, said traversing means traversing the graph by successively traveling from previously selected nodes to previously unselected nodes along said lines without processing any node more than once; and
   printing means for creating elements of the three-dimensional object on a page by drawing a corresponding polygon for each node as the nodes are visited.

3. A method of constructing elements for a three-dimensional object having a plurality of flat polygonal surfaces, said method comprising:
   providing a visual model of the object;
   constructing a graph from the visual model, said graph comprising a plurality of nodes connected by lines, each node representing one of the polygonal surfaces and each line connecting the nodes corresponding to an edge of the visual model located between corresponding polygonal surfaces;
   selecting one of said nodes and traversing the graph beginning at the selected node, said traversing comprising successively traveling from previously selected nodes to previously unselected nodes along said lines without processing any node more than once; and
   creating elements of the three-dimensional object on a page by drawing a corresponding polygon for each node as the nodes are visited to form a two-dimensional unfolded pattern.

4. The method according to claim 3, wherein said act of drawing a corresponding polygon comprises drawing said polygon such that each boundary of the drawn polygon corresponding to a line between nodes correlates to a corresponding edge of the three dimensional object.

5. The method according to claim 3, wherein said traversing includes choosing an order of nodes for traversal such that when the polygons are drawn, a shape does not result which is larger than the page.

6. The method according to claim 3, wherein said traversing includes choosing an order of nodes for traversal such that a selected node which corresponds to a polygon, contains a longest boundary to any adjacent polygon previously selected.

7. The method according to claim 3, wherein said selecting includes selecting a node which corresponds to a polygon having a longest boundary with the polygon of the currently selected node.

8. The method according to claim 3, wherein said traversing includes choosing an order of nodes for traversal such that when the polygons are drawn, an overlap of polygons will not result.

9. The method according to claim 3, wherein when an order of traversal of nodes results in one of the following conditions: 1) an overlap of polygons; 2) a shape which is larger than a page; and 3) remaining nodes not reachable from previously selected nodes, said method further comprises the steps of:
   a) traversing adjacent nodes on the graph until reaching a node prior to satisfy, one of the conditions;
   b) drawing the corresponding polygons for each traversed node on a first piece of paper;
   c) removing each traversed node from the graph;
   d) selecting a beginning node from remaining nodes in the graph;
   e) traversing the remaining nodes until reaching a node prior to satisfying one of the conditions;
   f) drawing corresponding polygons for each remaining node traversed on an additional piece of paper; and
   g) repeating steps c) through f) until all of the nodes have been traversed and all polygons have been drawn.

10. The method according to claim 3, further comprising:
    determining a layout of polygons on the page prior to printing of the page;
    printing polygon edges which correspond to lines followed in the traversal in one print style; and
    printing remaining polygon edges in a print style different from said one print style.

11. The method according to claim 3, further comprising:
    determining a layout of polygons on the page prior to printing of the page; and
    printing labels associated with graph lines on polygon edges which do not correspond to lines of the graph followed in its traversal, said labels indicating which pairs of said edges should be joined together when assembling the three-dimensional object.

12. An apparatus for constructing elements for a three-dimensional object having a plurality of flat polygonal surfaces, said apparatus comprising:
    visual model specifying means for specifying a visual model of the object;
    processing means including:
       constructing means for constructing a graph from the visual model, said graph comprising a plurality of nodes connected by lines, each node representing one of the polygonal surfaces and each line connecting the nodes corresponding to an edge of the visual model located between corresponding polygonal surfaces;
    selecting means for selecting one of said nodes; and
    traversing means for traversing the graph beginning at the node selected by said selecting means, said traversing means traversing the graph by successively traveling from previously selected nodes to previously unselected nodes along said lines without processing any node more than once; and
    printing means for creating elements of the three-dimensional object on a page by drawing a corresponding polygon for each node as the nodes are visited to form a two-dimensional unfolded pattern.

13. The apparatus according to claim 12, wherein said printing means draws said polygons such that each boundary of the drawn polygons corresponding to a line between nodes correlates to a corresponding edge of the three dimensional object.

14. The apparatus according to claim 12, wherein said traversing means chooses an order of nodes for traversal such that when the polygons are drawn, a shape does not result which is larger than the page.

15. The apparatus according to claim 12, wherein said traversing means chooses an order of nodes for traversal such that a selected node which corresponds to a polygon, contains a longest boundary to any adjacent polygon previously selected.

16. The apparatus according to claim 12, wherein said selecting means selects a node which corresponds to a polygon having a longest boundary with the polygon of the currently selected node.

17. The apparatus according to claim 12, wherein said traversing means choses an order of nodes for traversal such that when the polygons are drawn, an overlap of polygons will not result.

18. The apparatus according to claim 12, wherein when an order of traversal of nodes results in one of the following conditions: 1) an overlap of polygons; 2) a shape which is larger than a page; and 3) remaining nodes not reachable from previously selected nodes, then:
    a) said traversing means traverses adjacent nodes on the graph until reaching a node prior to satisfying one of the conditions;
    b) said printing means draws a corresponding polygon for each traversed node on a first piece of paper;
    c) said processing means removes each traversed node from the graph;
    d) said selecting means selects a beginning node from remaining nodes of the graph;
    e) said traversing means traverses the remaining nodes until reaching a node prior to satisfying one of the conditions;
    f) said printing means draws corresponding polygons for each remaining node traversed on an additional piece of paper; and
    g) said selecting means, said traversing means and said printing means repeat c) through f) until all of the nodes have been traversed and all polygons have been drawn.

19. The apparatus according to claim 12, wherein said processing means includes determining means for determining a layout of polygons on the page prior to printing of the page by said printing means, said printing means printing polygon edges which correspond to lines followed in the traversal in one print style and said printing means printing remaining polygon edges in a print style different from said one print style.

20. The apparatus according to claim 12, wherein said processing means includes determining means for determining a layout of polygons on the page prior to printing of the page and said printing means prints labels associated with graph lines on the polygon edges which do not correspond to lines of the graph followed in its traversal, said printing means printing said labels to indicate which pairs of said edges should be joined together when assembling the three-dimensional object.

* * * * *